United States Patent [19]
Harris et al.

[11] 3,999,885
[45] Dec. 28, 1976

[54] TURBINE METER SPIDER LOCK

[75] Inventors: Lewis Karl Harris; Billy Steve Burrus, both of Tulsa, Okla.

[73] Assignee: Combustion Engineering, Inc., Windsor, Conn.

[22] Filed: Sept. 15, 1975

[21] Appl. No.: 613,691

[52] U.S. Cl. .................... 415/210; 403/349; 73/231 R
[51] Int. Cl.² ........................ F04D 29/52
[58] Field of Search ......... 73/231 R; 415/217, 136, 415/156, 210, 209; 403/349, 353; 416/221

[56] References Cited
UNITED STATES PATENTS

| | | | |
|---|---|---|---|
| 1,510,806 | 10/1924 | Snider | 308/26 |
| 1,923,892 | 8/1933 | Skillman | 308/26 |
| 2,614,747 | 10/1952 | Christensen | 415/156 |
| 2,941,848 | 6/1960 | Johnson | 308/26 |
| 3,433,071 | 3/1969 | Homrig | 73/231 R |
| 3,798,968 | 3/1974 | Harris | 73/231 R |

FOREIGN PATENTS OR APPLICATIONS

| | | | |
|---|---|---|---|
| 874,251 | 6/1971 | Canada | 415/136 |
| 1,278,190 | 10/1961 | France | 73/231 R |

*Primary Examiner*—Henry F. Raduazo
*Attorney, Agent, or Firm*—Arthur L. Wade

[57] ABSTRACT

The rotor of a turbine meter is supported in the bore of its housing between a pair of spiders. One vane of each spider has structure with which it engages grooves in the bore wall to lock the spider in place within the bore.

3 Claims, 2 Drawing Figures

TURBINE METER SPIDER LOCK

BACKGROUND OF THE INVENTION

1. Field of the Invention

The present invention relates to mounting the rotor of a turbine meter within the bore of the meter body with a spider support having a manually springable section which engages a retaining groove in the bore wall. More specifically, the invention relates to a bearing support which utilizes a particular shape for at least one of the vanes of spider structure to engage a groove in the bore of the meter body to retain the spider in position within the bore, the vane shape being manually distorted to disengage the groove for ready removal of the spider structure from the bore.

2. Description of the Prior Art

The prior art is replete with different forms for bearing supports in turbine meters. Further, there are many prior art structures for retaining bearing supports in the bores of turbine meters. However, all of the prior art retaining structures are too complex in form for use in metering food fluids. All of the prior art structures have crevices formed with engaging surfaces which harbor food material in which harmful bacteria form.

SUMMARY OF THE INVENTION

It is an object of the present invention to provide a shape for at least one of the radiating vane members of a turbine meter rotor support which can be retained in the bore of the meter and manually released from the bore without crevices which will retain food substances in which bacteria will develop.

The present invention contemplates the use of a spider for a turbine meter having elongated vanes radiating to the walls of the meter body bore. At least one of the vanes has a portion shaped to engage a groove in the bore walls to retain the spider in a desired location with the bore. The shaped vane portion and the groove it engages are so simple that they are readily flushed clean and do not retain bacteria-forming food fluids which are measured by the meter. The shaped vane portion is manually distorted by a hand tool easily inserted into the body bore to disengage the vane portion from the wall groove.

Other objects, advantages and features of this invention will become apparent to one skilled in the art upon consideration of the written specification, appended claims, and attached drawings, wherein;

FIG. 1 is a sectioned elevation in perspective of a turbine meter body with supports for the rotor bearing including the present invention; and FIG. 2 is a perspective of one of the two bearing supports disclosing the distortable portion of the vane in greater detail.

DESCRIPTION OF THE PREFERRED EMBODIMENT

Figure 1:
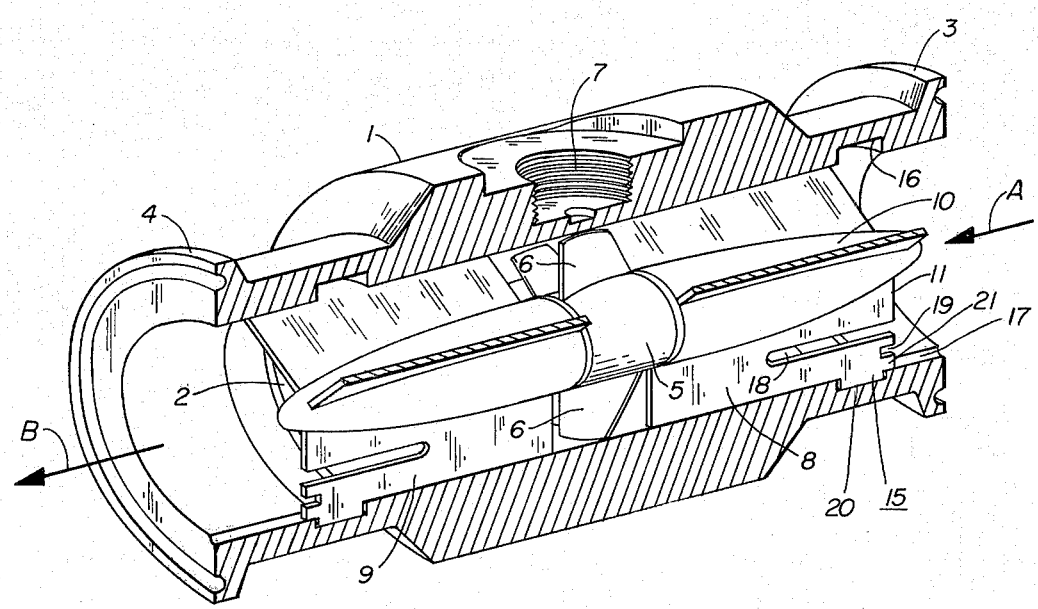

Referring to FIG. 1, there is disclosed a flanged body of a turbine meter. Body 1 has a central bore 2 through which fluids to be metered are flowed. Arrow A indicates the direction of fluid flow into the bore 2 and arrow B indicates the flow out of the bore. Flanges 3, 4 represent one means with which the body 1 can be included in a conduit and respond to the fluid as it flows therethrough.

The primary element of the meter which responds to the fluid flow is rotor 5. It is basically the object of the invention to support rotor 5 on bearings within bore 2 so it will rotate in response to the fluid flow. The rotor vanes 6 each cut magnetic lines of force sustained by a pickup element mounted in receptacle 7. The rate at which the lines of force are cut becomes a measure of the fluid flow rate through bore 2.

Rotor 5 is a shell-like housing to which rotor vanes 6 are attached on its external surface. The specific bearing and shaft support for rotor-housing 5 can take many forms. Whatever the specific form of bearing, the rotor-housing 5 is rotatably mounted at the axis of meter body 1 between spiders 8 and 9.

Spiders 8 and 9 comprise a central, elongated body and vanes radiating outward to engage the walls of bore 2. Refer to upstream spider 8. Body 10 may be cast with vanes 11, 12, 13 as an extended part of the body. There could be more, but usually three vanes are adequate for the required stability for rotor 5.

Having cleared the preliminaries and given the proper setting, the present invention can now be hopefully disclosed with simplicity and clarity. The structure embodying the invention is in the vanes of the spiders and the structure engaging the vanes at the walls of bore 2.

Figure 2:
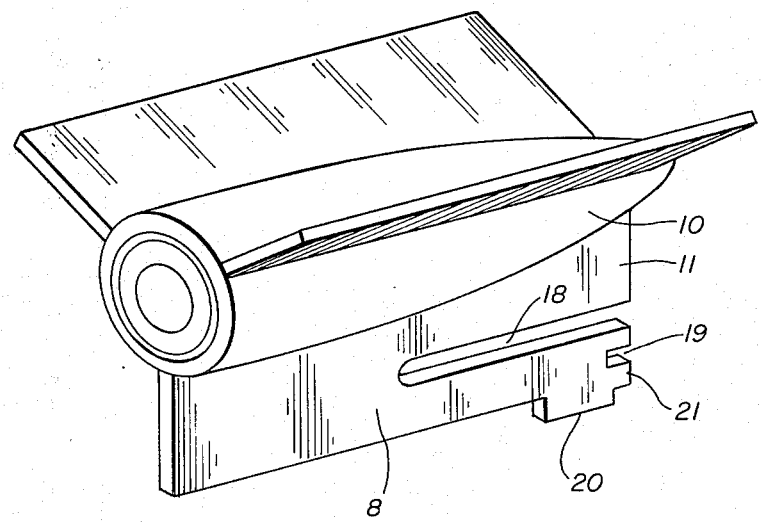

Refer to both FIGS. 1 and 2 and it will be evident that all three vanes 11, 12 and 13 of spider 8 extend to the wall of bore 2, but vane 11 has a structure extension which engages a groove system in the bore wall. Specifically, extension 15 on vane 11 fits down into both circumferential groove 16 and longitudinal groove 17. This extension and groove engagement effectively fixes the vanes 11 and its entire spider 8 at the desired location for end support of rotor 5.

The stark simplicity of the grooves and vane extension militate against the dreaded collection of food material in which bacteria develops to contaminate. True the grooves 16 and 17 are crevices in a broad sense. True extension 15 engages the grooves to form a "pocket" in which food passing through bore 2 tends to collect to some extent. However, compared with the complexity of prior art retaining structures, the groove - extension structure disclosed is readily cleaned and has a minimal "catching" function. The arrangement gives a stable, rugged, dependable coupling between the body 1 and bearing spiders mounted within the bore of the body. At the same time the structure meets the present standards for a "sanitary" turbine meter. At this point in time no other known, commercially available, turbine meter structure is accepted by the food industry for the service of metering food fluids. A significant breakthrough has been made in this particular art.

There are several details remaining to be explained. It is all well and good to point out that extension 15 of vane 11 is in place, in grooves 16 and 17. But how did it get placed snugly down into the grooves? Slot 18 becomes a good explanation when its function is understood.

Extension 15 is on the end of vane 11. Vane 11 has slot 18 formed along a length of vane 11 to result in the outward end of vane 11 being made flexible enough to move extension 15 free of engagement with the grooves. In other words, the vane 11 below slot 18 can be bent, or sprung inward, toward the axis of bore 2 enough to lift extension 15 out of the grooves. Just the width of slot 18 which will give the required inward movement of extension 15 to disengage the extension from the grooves is a matter of design. The basic point is that the end of vane 11 can be made flexible by means of slot 18 to perform the required function of disengagement.

The force of disengagement is, of course, that force applied to the end of vane 11 to spring it inward, toward the axis of bore 2. This force can be readily generated manually. A slot 19 is provided in extension 15 which can be engaged by a simple, screwdriver type of tool. Such tool can be used to pry the extension 15 upward for the disengagement.

Becoming more specific, relative to extension 15, the drawing disclosure is clear in that the specific portion of extension 15 engaged with circumferential groove 16 is the lowermost sub-extension 20. The length of this sub-extension is cut to fit as snugly into groove 16 as required of the design. Basically, the fit will prevent longitudinal movement of the spider in the bore 2. The spider is locked in place by this engagement.

Rotational movement of the spider is prevented by engagement of sub-extension 21 with groove 17. Both sub-extensions then fit into their respective grooves to stabilize the position of the spider in bore 2. Normally the spider is stabilized. When it is desired to remove the spider for repair, service or replacement, the groove 19 is engaged by the simple hand tool and extension 15 is lifted from the grooves and the spider slides down the bore 2 to freedom.

CONCLUSION — SUMMARY

The invention is embodied, broadly, in a support for the rotor of a turbine meter. More specifically, the support is in a pair of assemblies mounted in the bore of the meter body.

Narrow the analysis of the invention still more. Each assembly is made up of a body which carries a portion of the bearing system for the rotor. The bearing body is elongated and along the axis of the meter body. Vanes may be an integral part of the bearing body. In any event, they radiate from the body to the bore walls, holding their bearing body in position. The assembly slides down the meter body bore into position.

One of the vanes has an extension which engages a system of grooves formed into the wall of the meter body bore. One part of the extension engages a circumferential groove to lock the assembly from moving back and forth in the meter body bore. A second part of the extension engages a longitudinal groove to lock the assembly from rotating in the meter body bore.

Finally, the vane on which the extension is mounted is formed to give that portion of the vane on which the extension is mounted enough flexibility to make it possible to lift the extension from engagement with the groove system and slide the complete assembly out of the meter body bore.

From the foregoing, it will be seen that this invention is one well adapted to attain all of the ends and objects hereinabove set forth, together with other advantages which are obvious and inherent to the apparatus.

It will be understood that certain features and sub-combinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. Support for the rotor of a turbine meter, comprising;
   a pair of assemblies mounted within the meter body bore, each assembly comprising;
   a bearing body of elongated form extended along the axis of the body on which is mounted a portion of the rotor bearing,
   a plurality of vanes extended between the elongated body and the bore walls,
   a groove extended circumferentially into the bore walls,
   an extension mounted on one of the vanes and engaging the groove to fix the longitudinal position of the bearing body in the meter body bore,
   and structure means in the vane on which the extension is mounted which makes that portion of the vane flexible enough in a direction radial of the meter body bore to manually disengage the extension from the groove and slide the complete assembly out of the body bore.

2. The support of claim 1 including, a groove extended longitudinally into the bore walls, and a portion of the extension engaging the longitudinal groove to prevent rotation of the assembly.

3. Support for the rotor of a turbine meter, comprising;
   a pair of assemblies mounted within the meter body bore, each assembly comprising;
   a bearing body of elongated form extended along the axis of the body on which is mounted a portion of the rotor bearing,
   a plurality of vanes extended between the elongated body and the bore walls,
   a groove extended circumferentially into the bore walls,
   an extension mounted on one of the vanes and engaging the groove to fix the longitudinal position of the bearing body in the meter body bore,
   and a longitudinal slot extended from the end of the vane on which the extension is mounted, the slot being long enough and wide enough to give the movement and flexibility required for the manual disengagement.

* * * * *